(12) United States Patent
Chen

(10) Patent No.: US 9,103,395 B2
(45) Date of Patent: Aug. 11, 2015

(54) ELASTICITY-ADJUSTABLE AIR PRESSURE SPRING

(75) Inventor: Ayu Chen, Zhejiang (CN)

(73) Assignee: XILINMEN FURNITURE CO., LTD., Yuecheng Shaoxing (CN)

( * ) Notice: Subject to any disclaimer, the term of this patent is extended or adjusted under 35 U.S.C. 154(b) by 0 days.

(21) Appl. No.: 13/980,270

(22) PCT Filed: Apr. 24, 2012

(86) PCT No.: PCT/CN2012/074579
§ 371 (c)(1),
(2), (4) Date: Jul. 17, 2013

(87) PCT Pub. No.: WO2013/107126
PCT Pub. Date: Jul. 25, 2013

(65) Prior Publication Data
US 2014/0042679 A1    Feb. 13, 2014

(30) Foreign Application Priority Data

Jan. 20, 2012 (CN) .......................... 2012 1 0019205
Jan. 20, 2012 (CN) .......................... 2012 2 0027633

(51) Int. Cl.
F16F 9/04    (2006.01)

(52) U.S. Cl.
CPC ............. *F16F 9/0409* (2013.01); *F16F 9/0418* (2013.01); *F16F 9/0481* (2013.01)

(58) Field of Classification Search
USPC ............. 267/64.15–64.27, 91, 118, 122, 126, 267/142
See application file for complete search history.

(56) References Cited

U.S. PATENT DOCUMENTS 2,878,012 A * 3/1959 Crites .......................... 267/122
3,262,138 A * 7/1966 Knittel ........................ 267/117
(Continued)

FOREIGN PATENT DOCUMENTS

CN    2133709 Y    5/1993
CN    2526587 Y    12/2002
(Continued)

*Primary Examiner* — Christopher Schwartz
(74) *Attorney, Agent, or Firm* — Tianhua Gu; Global IP Services

(57) ABSTRACT

An elasticity-adjustable air pressure spring designed by the invention solves the technical problems of complex structure and top-to-bottom air impenetrability in the current gas springs. The elasticity-adjustable air pressure spring comprises a spring body, and is characterized in that the spring body is formed by at least one hollow cavity column of a double-layer sidewall structure, a closed cavity containing pressure air is formed between the double layers of the sidewall, the cavity column is corrugated, and at least one vent hole communicated with the cavity is arranged on the sidewall of the cavity column. By using the corrugated structure like an accordion box and filling the pressure air, the hardness of the elasticity-adjustable air pressure spring is adjusted, the elasticity-adjustable air pressure spring is particularly good in transverse and longitudinal ventilation, a mattress comprising the elasticity-adjustable air pressure spring is easy to remove moisture so that the influence on human body health is eliminated; the elasticity-adjustable air pressure spring is convenient in hardness adjustment and wide in one-way deformation range, meets various demands and can be adjusted in real time to enhance the comfortable level; in addition, the elasticity-adjustable air pressure spring is convenient for coiled package to save the transportation cost, and can be unfolded by inflation when used by a user.

8 Claims, 7 Drawing Sheets

(56) References Cited

U.S. PATENT DOCUMENTS

| | | | | |
|---|---|---|---|---|
| 3,321,200 | A | * | 5/1967 | Polhemus et al. ......... 267/64.27 |
| 3,533,113 | A | * | 10/1970 | Stamberger ....................... 5/654 |
| 3,815,887 | A | * | 6/1974 | Curtis et al. ..................... 267/91 |
| 5,566,929 | A | * | 10/1996 | Thurow ..................... 267/64.24 |
| 5,580,033 | A | * | 12/1996 | Burkley et al. ............ 267/64.27 |
| 5,638,565 | A | * | 6/1997 | Pekar ................................ 5/710 |
| 7,665,484 | B2 | * | 2/2010 | Kamada et al. ................ 138/30 |

| | | |
|---|---|---|
| 2011/0014031 | A1 | 1/2011 Kawashita et al. |

FOREIGN PATENT DOCUMENTS

| | | |
|---|---|---|
| CN | 1704637 A | 12/2005 |
| CN | 201407309 Y | 2/2010 |
| CN | 1021116353 A | 7/2011 |
| WO | WO2009/030906 A1 | 3/2009 |

* cited by examiner

ELASTICITY-ADJUSTABLE AIR PRESSURE SPRING

TECHNICAL FIELD

The invention relates to the technical field of spring manufacturing, in particular to an elasticity-adjustable air pressure spring.

BACKGROUND

In terms of functionality, 'springs' can be classified in three categories including compression spring, torsion spring and tension spring, and common compression spring is formed by spirally coiling metal wires with strong elasticity, such as steel wires, and generates elasticity by means of their elastic deformation. Such a compression spring is fixed and nonadjustable in elasticity after being formed and still takes up a large space after being compressed, and satisfactory comfortable level cannot be imparted to all the application areas when it is used for spring mattress and the like. Gas spring has been designed, but it consists of a cylinder, a piston (push rod), an additional built-in spring and other parts, which leads to complex structure and high requirement on inter-part fitting, and in particular, pistons are arranged respectively on the upper and lower ends of a flexible cylindrical body and a hollow cavity is formed therebetween to bring about spring effect, however, there is a defect of top-to-bottom air impenetrability, therefore, when it is used for mattress compression spring, moisture generated by human body or moisture in the environment will gather and cannot be removed through air convection, negative influence on body health is inevitable in the event that people sleeps on the air spring mattress filled with moisture; furthermore, the gas spring above is insufficient in deformation stroke and small in hardness adjustment range, and stills takes up a large space when not used.

SUMMARY OF THE INVENTION

The objective of the invention is to solve the shortcomings in the prior art discussed above and accordingly provides an elasticity-adjustable air pressure spring, which is adjustable in elasticity, good in ventilation, long in deformation stroke and small in space after being compressed.

To achieve the objective above, the elasticity-adjustable air pressure spring designed by the invention comprises a spring body and is characterized in that, the spring body is formed by at least one hollow cavity column of a double-layer sidewall structure, a closed cavity containing pressure air is formed between the double layers of the sidewall, the cavity column is corrugated, and at least one vent hole communicated with the cavity is arranged on the sidewall of the cavity column. In the technical proposal defined by the invention, a hollow structure is employed to result in good top-to-bottom air penetrability and low possibility of moisture deposition and to avoid the influence of gathered moisture on human body health when spring is used for mattress, sofa, massage and cushion; the hardness (elasticity) of the air pressure spring can be adjusted in real-time by means of inflation or deflation through the vent hole, thus improving the comfortable level and the applicable scope; the corrugated cavity column means that the walls of the cavity column, instead of linear sides, are linear or curved sides that are repeatedly turned in inward and outward directions, the air pressure spring in which the deformation stroke of the cavity column is changed by deformation of a corrugated structure is different from the current gas spring in which deformation is generated only by the flexible change of the material itself, so the air pressure spring has the advantages of large deformation and wide hardness adjustment range; after the pressure air in the cavity is eliminated and the air pressure spring is compressed, the spring takes up a small space and can be coiled to facilitate package, storage and transportation. The cavity columns may be independent, or may be formed in rows or in lines, and the cavities of the cavity columns may be either independent of or communicated with each other.

As further perfection and completion for the structure discussed above, the invention also includes the following additional technical features and random combinations of these features:

air holes transversely penetrating through the cavity are arranged on the cavity column, thus providing a transverse air convection channel of the air pressure spring so as to further improve its ventilation effect.

The cavity column is at least provided with an annular section with linear surfaces, and the linear surfaces form connection planes for connection between the adjacent independent air springs, and the connection planes may be uniformly distributed on the annular section in a cruciform pattern, so that connection with the cavity column in a plurality of directions is realized and good expandability is obtained.

The cross section of the annular section is a symmetrical octagon with long and short sides being annularly connected in sequence, the linear surfaces are located at the four short sides of the octagon respectively, and the connection planes are regular and united and good in connection.

The upper and lower two ends of the corrugated section in the middle of the cavity column form the annular sections with the diameter expanded outwards, and cavity column mouths with the diameter reduced are arranged at the outer ends of the annular sections, that is, the diameter of the cavity column mouths at the upper and lower ends is smaller than the annular sections in order to create independent support and reduce mutual pulling deformation between the cavity columns, as a result, mutual interference is small, recess formation is avoided, and better adherence to human body profile is achieved so as to enhance the comfortable level; a space for air pipe installation can be reserved in the middle corrugated section and is also favorable for transverse flowing of air.

A steel wire-made shaping ring is lined at the cavity column mouth of the cavity column and may also be made of copper wire, plastic ring or other hard elastic materials, preferably steel wire, this is because it has good deformation resistance so as to be liable to restore after extrusion by an external force, and it also has good support property.

The vent hole is arranged on the inner folded edge of the annular section and is provided with an air valve, the corrugated section at this location is recessed inwards in relation to the annular section, and large installation space contributes to connection with the air pipe and the air valve.

At least one layer of the sidewall of the cavity column is formed by a macromolecular organic material or by laminating the macromolecular organic material and a fabric, and laminating the macromolecular organic material and the fabric means filling of the macromolecular organic material in the pores of the fabric or covering of the macromolecular organic material at one side of the fabric. The macromolecular organic material herein includes rubber, TPU and/or nylon, the effect of sealing pressure air can be achieved by adopting macromolecular materials like rubber, besides, leak repair can be implemented via a leak repair agent in order to improve softness and sealing property; the fabric plays a role of shaping, so that the air pressure spring is free from excessive extended deformation subsequent to filling of pressure air, and sufficient strength is imparted to cavity wall.

The cavity column has a height of 4-20 cm, if the cavity column is too high, deformation stroke of the cavity column will be too long, leading to instability, and if the cavity column is too low, the comfortable level will be reduced due to relatively high hardness; the cavity column has a diameter of 4-8.5 cm, if the diameter is too large, surface materials laid on the cavity column will be immersed from the hollow part to create a pit, and if the diameter is too small, the bottom surface is narrowed and the cavity column is unstable and accordingly liable to swing under pressure.

The cross section of the cavity column is round or polygonal, which further meets the demands on hardness, distribution density of the air pressure spring, ventilation effect and material selection in the aspect of sectional shape.

An elasticity-adjustable air pressure spring obtained by the invention overcomes the defects of great corrosion possibility and nonadjustable elasticity in metal spring and also overcomes the defects of complex structure and poor ventilation in piston (push rod) type gas spring; the structural shape of the cavity column is changed in the elasticity-adjustable air pressure spring, and by using the corrugated structure like an accordion box and filling pressure air, the hardness of the elasticity-adjustable air pressure spring is conveniently adjusted; in particular, the spring has the advantages of large deformation stroke and good transverse and longitudinal ventilation, is used for manufacturing soft mattress, sofa, massage chair, cushion and the like, and is easy for removing moisture so that the influence on human health is eliminated; the spring is convenient in hardness adjustment and wide in one-way deformation range, meets various demands and can be adjusted in real time to enhance the comfortable level; in addition, the elasticity-adjustable air pressure spring is convenient for coiled package to save the transportation cost, and can be unfolded by inflation when used by a user.

BRIEF DESCRIPTION OF THE DRAWINGS

FIG. 6 is rotated angularly.

Figure 1:
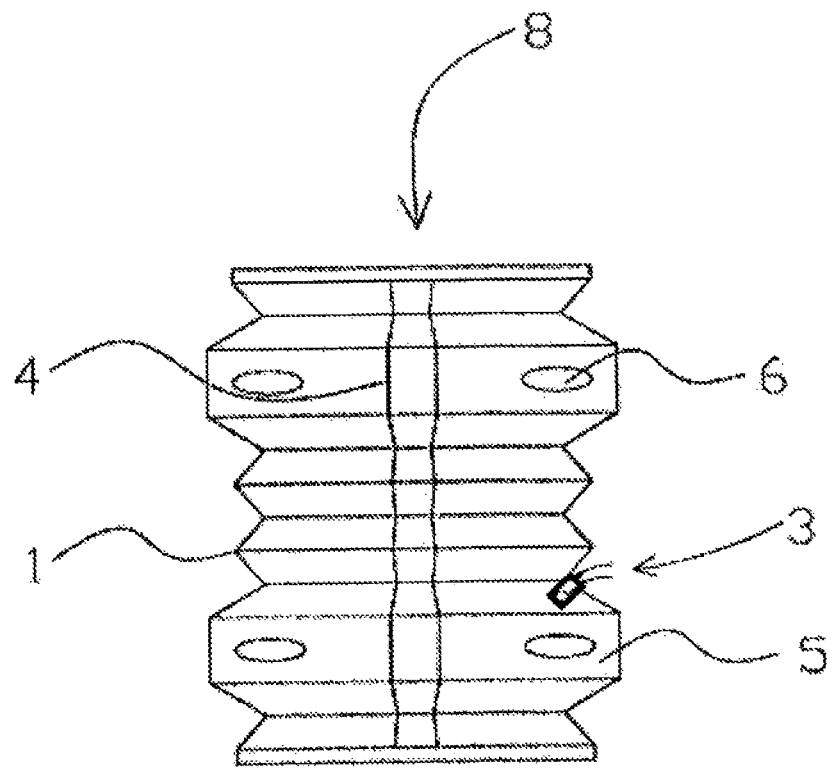
FIG. 1 is a structure diagram of one embodiment of the invention.

In the drawings: 1—cavity column, 2—cavity, 3—vent hole (air pipe), 4—linear surface, 5—annular section, 6—air hole, 7—shaping ring, and 8—cavity column mouth.

DETAILED DESCRIPTION OF THE EMBODIMENTS

Further description is made below to the invention by the embodiments with reference to the drawings.

Embodiment 1

Figure 2:
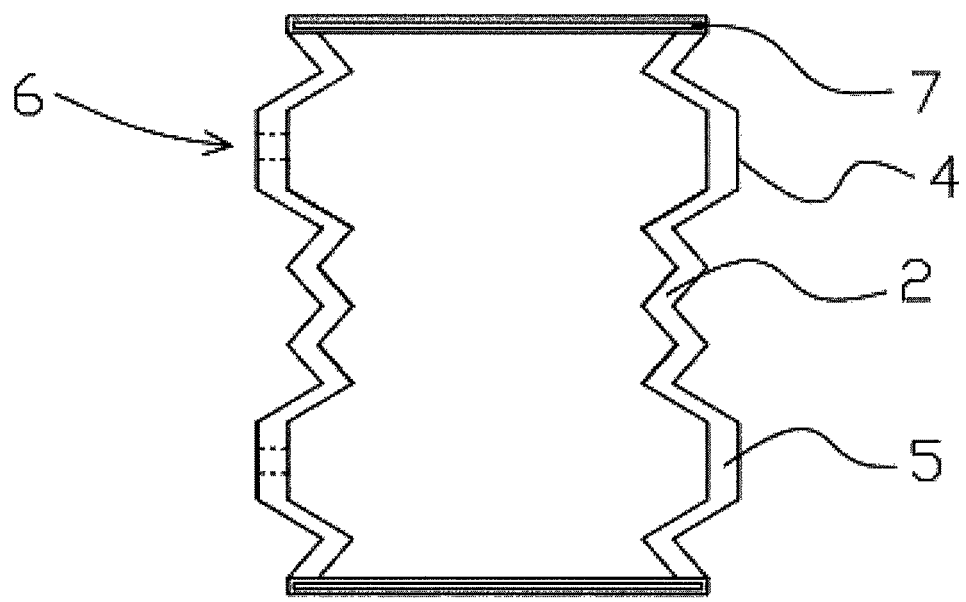
FIG. 2 is a sectional view of FIG. 1.
Figure 3:
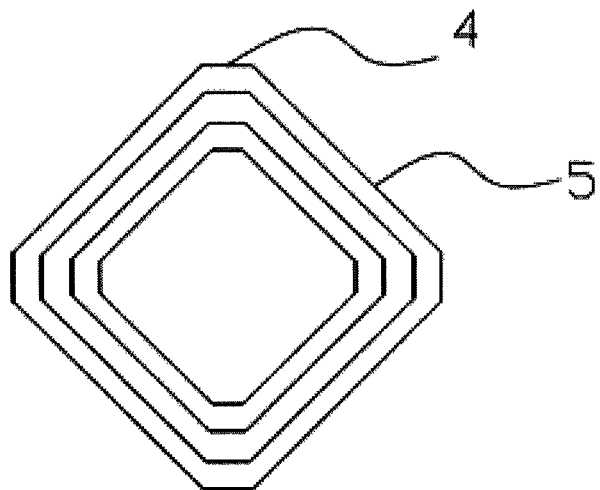
FIG. 3 is a top view of FIG. 1.

As shown in FIG. 1 to FIG. 3, an elasticity-adjustable air pressure spring described in this embodiment comprises a spring body, the spring body is formed by one hollow cavity column 1 of a double-layer sidewall structure, a closed cavity 2 containing pressure air is formed between the double layers of the sidewall, the cavity column 1 is corrugated, and at least one vent hole 3 communicated with the cavity 2 is arranged on the cavity column 1, at least one layer of, the sidewall of the cavity column 1 is formed by rubber, nylon, TPU or a composite material of the rubber, nylon or TPU and a fabric, and the rubber, nylon and/or TPU is filled in the pores of the fabric or covers one side of the fabric. The upper and lower two ends of the corrugated section in the middle of the cavity column 1 form two annular sections 5 with the diameter expanded outwards and with linear surfaces 4, cavity column mouths 8 with the diameter reduced are arranged at the outer ends of the two annular sections 5, the linear surfaces 4 form connection planes for connection between adjacent single air springs, the cross section of the annular section 5 is a symmetrical octagon with long and short sides being annularly connected in sequence, the linear surfaces 4 are located at the four short sides of the octagon respectively, and the connection planes are regular and united and good in connection. Air holes 6 transversely penetrating through the cavity 2 are arranged on the annular section 5 and may be arranged at the four long sides of the octagon respectively, thus good transverse ventilation is achieved. The cavity column mouth 8 of the cavity column 1 may also be an octagon that is corresponding to the annular section 5 vertically. A steel wire-made shaping ring 7 is lined at the cavity column mouth of the cavity column 1, bringing better support property. The cavity column 1 has a height of 4-20 cm and a diameter of 4-8.5 cm, the vent hole 3 is arranged on the inner folded edge of the annular section 5 and is provided with an air valve, and this location is recessed inwards to obtain large installation space. The 'corrugated shape' of the cavity column 1 means difference from an air spring with cylindrical section, linear side is excluded for the inner and outer walls of the cavity column 1, which include, but not limited to, curved side and folded side, in this way, the cavity column has excellent deformation space. The inner side wall of the cavity column 1 is thinner than the outer side wall, thus enabling the outer side wall to withstand more connection pulling force.

The vent hole 3 may be connected to an air pump component via an air pipe, and the hardness is adjusted in real-time by inflating or deflating the elasticity-adjustable air pressure spring. There may be one or two vent holes 3, and the specific quantity is determined based upon the design requirement in air pressure adjustment.

Figure 4:
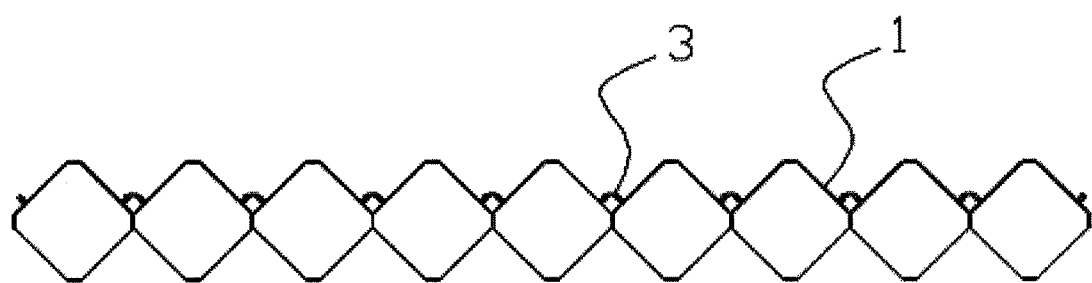
FIG. 4 is a structure diagram of the invention connected in a row.
Figure 5:
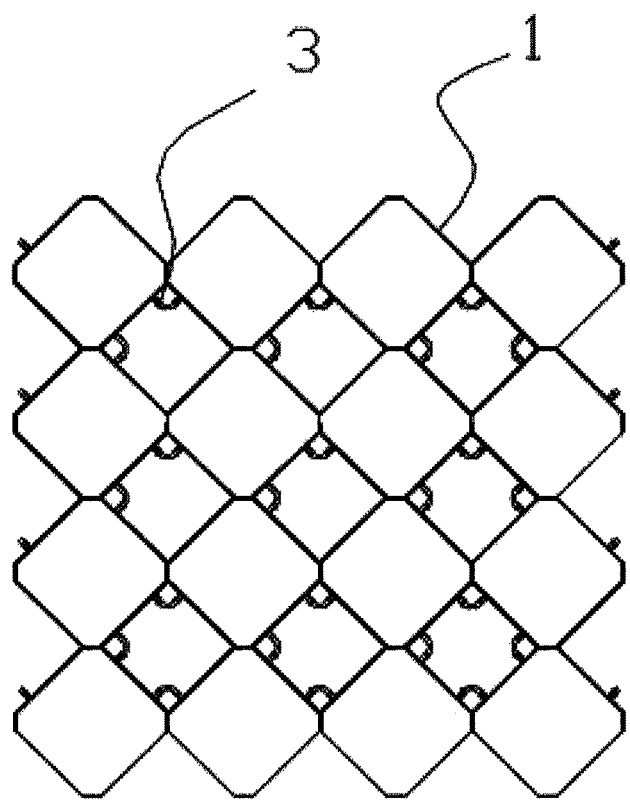
FIG. 5 is a structure diagram of the invention connected by multiple planes.

As shown in FIG. 4 and FIG. 5, the air pressure springs may also be connected with each other by a plurality of cavity columns 1 and distributed in any shape, and the cavities 2 of the cavity columns 1 may be independent of each other or communicated with each other.

Embodiment 2

Figure 6:
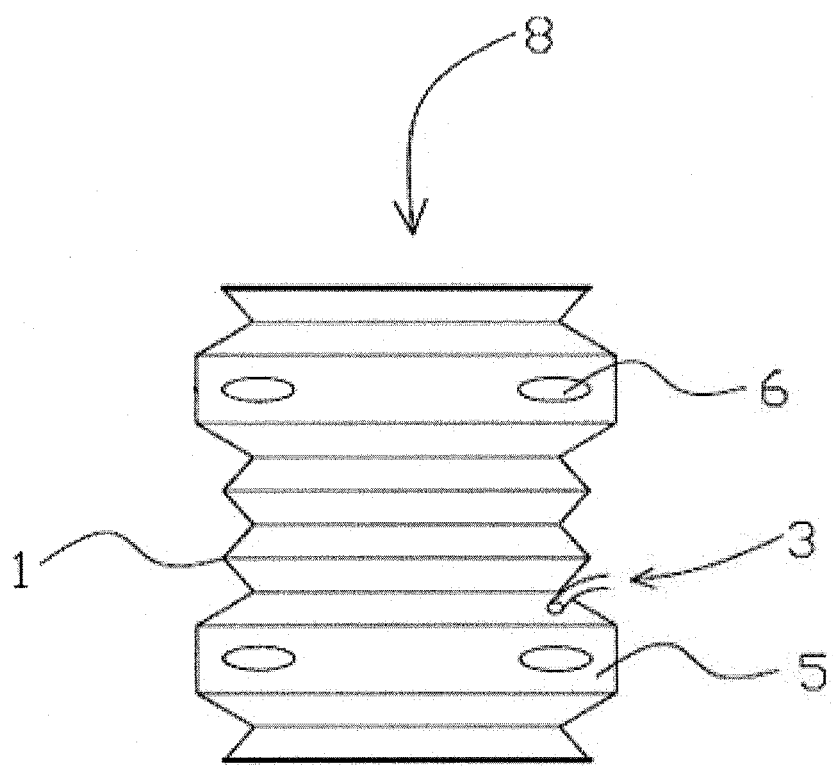
FIG. 6 is a structure diagram of another embodiment of the invention.
Figure 7:
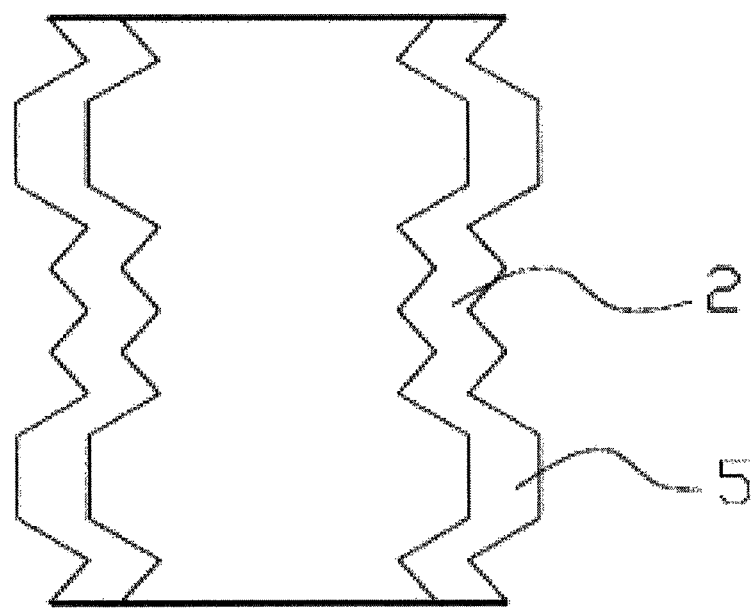
FIG. 7 is a sectional view of FIG. 6.
Figure 8:
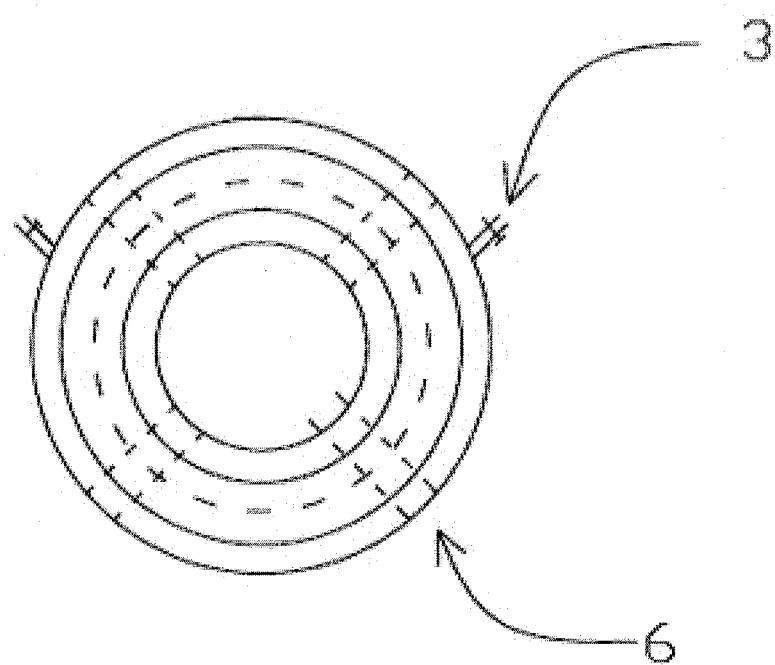
FIG. 8 is a top view of FIG. 6, i.e. a schematic diagram after

As shown in FIG. 6 to FIG. 8, the cross section of the cavity column 1 is round, the cross section of the annular section 5 is also round, there are two vent holes 3, and four air holes 6 are uniformly distributed on the annular section 5 in a cruciform pattern.

In the technical proposal of the invention, the cross section of the cavity column 1 may also be any polygon, and the thickness of the cavity 2 can be determined as required.

The invention claimed is:

1. An elasticity-adjustable air pressure spring comprising a spring body, characterized in that, the spring body is configured as a corrugated hollow column composed by a double-layer sidewall structure, which has two sidewalls to compose a closed cavity for containing pressure air therein, at least one vent hole provided with an air valve is arranged on one sidewall for regulating air pressure in the closed cavity, the cavity column is provided with at least an annular section with linear surface, and the linear surface forms a connection plane, an air hole is arranged on the linear surface.

2. The elasticity-adjustable air pressure spring according to claim 1, wherein two sections located upside and underside of a middle section of the corrugated hollow column are annular sections with larger diameters than the middle section respectively, and two end mouths of the corrugated hollow column have reduced diameters than the larger diameters.

3. The elasticity-adjustable air pressure spring according to claim 2, wherein a steel wire-made shaping ring is lined at a mouth of the corrugated hollow column.

4. The elasticity-adjustable air pressure spring according to claim 3, wherein the vent hole is arranged on an inner folded edge of the annular section.

5. The elasticity-adjustable air pressure spring according to claim 4, wherein the sidewall of the corrugated hollow column is formed by a fabric filed with polymers.

6. The elasticity-adjustable air pressure spring according to claim 5, wherein the corrugated hollow column has a height of 4-20 cm and a diameter of 4-8.5 cm.

7. The elasticity-adjustable air pressure spring according to claim 1, wherein a cross section of the annular section is a symmetrical octagon with long and short sides being annularly connected in sequence, and the linear surfaces are located at the four short sides of the octagon respectively.

8. The elasticity-adjustable air pressure spring according to claim 1, wherein the cross section of the corrugated hollow column is round or polygonal.

\* \* \* \* \*